United States Patent
Lim et al.

(10) Patent No.: US 12,505,895 B2
(45) Date of Patent: Dec. 23, 2025

(54) SEMICONDUCTOR DEVICE INCLUDING REPAIR STORAGE

(71) Applicant: SAMSUNG ELECTRONICS CO., LTD., Suwon-si (KR)

(72) Inventors: Yoseop Lim, Suwon-si (KR); Dongkwan Han, Suwon-si (KR); Seohyun Kang, Suwon-si (KR); Hyeonuk Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 158 days.

(21) Appl. No.: 18/065,620

(22) Filed: Dec. 13, 2022

(65) Prior Publication Data

US 2023/0307076 A1   Sep. 28, 2023

(30) Foreign Application Priority Data

Mar. 28, 2022   (KR) .......................... 10-2022-0038190

(51) Int. Cl.
   *G11C 29/04* (2006.01)
   *G06F 3/06* (2006.01)

(52) U.S. Cl.
   CPC ............ *G11C 29/04* (2013.01); *G06F 3/0619* (2013.01); *G06F 3/064* (2013.01); *G06F 3/0679* (2013.01)

(58) Field of Classification Search
   CPC ....... G11C 29/04; G06F 3/0619; G06F 3/064; G06F 3/0679
   See application file for complete search history.

(56) References Cited

U.S. PATENT DOCUMENTS

| 8,089,812 B2 | 1/2012 | Kim et al. |
| 8,575,996 B2 | 11/2013 | Choi |
| 8,891,322 B2 | 11/2014 | Pyeon |
| 8,897,087 B2 | 11/2014 | Yoon et al. |

(Continued)

FOREIGN PATENT DOCUMENTS

KR   10-2015-0119547 A   10/2015

OTHER PUBLICATIONS

Office Action dated Oct. 29, 2025 issued in corresponding to Korean Patent Application No. 10-2022-0038190.

Primary Examiner — Jigar P Patel
(74) Attorney, Agent, or Firm — Morgan, Lewis & Bockius LLP

(57) ABSTRACT

A semiconductor device includes a first semiconductor die including a plurality of first memory blocks and a plurality of first repair registers respectively connected to the plurality of first memory block, and a second semiconductor die including a plurality of second memory blocks, a plurality of second repair registers respectively connected to the plurality of second memory blocks, and a repair storage in which first pieces of repair information for the plurality of first memory blocks and second pieces of repair information for the plurality of second repair blocks are stored. The first semiconductor die and the second semiconductor die are stacked on each other, and when the semiconductor device is powered on, the plurality of first repair registers receive and store the first pieces of repair information from the repair storage, and the plurality of first memory blocks perform a repair operation based on the first pieces of repair information stored in the plurality of first repair registers.

19 Claims, 14 Drawing Sheets

(56) References Cited

U.S. PATENT DOCUMENTS

| | | | |
|---|---|---|---|
| 8,917,569 B2 | 12/2014 | Choi et al. | |
| 9,003,252 B1 | 4/2015 | Aharoni et al. | |
| 9,158,619 B2 * | 10/2015 | Kobla | G11C 29/4401 |
| 9,252,062 B2 | 2/2016 | Ide et al. | |
| 9,471,420 B2 | 10/2016 | Yoon et al. | |
| 10,249,597 B2 * | 4/2019 | Pappu | G11C 29/702 |
| 10,998,081 B1 * | 5/2021 | Park | G11C 29/52 |
| 2006/0085700 A1 * | 4/2006 | Fong | G11C 15/00 |
| | | | 714/710 |
| 2009/0213634 A1 | 8/2009 | Shibata | |
| 2010/0290299 A1 | 11/2010 | Matsumoto et al. | |
| 2013/0168674 A1 | 7/2013 | Franzon et al. | |
| 2014/0082453 A1 * | 3/2014 | Sikdar | G06F 11/108 |
| | | | 714/763 |
| 2017/0309349 A1 * | 10/2017 | Mondal | G11C 29/38 |
| 2019/0180840 A1 | 6/2019 | Kang et al. | |
| 2019/0272100 A1 * | 9/2019 | Yu | G06F 3/0683 |
| 2021/0166776 A1 * | 6/2021 | Wieduwilt | G11C 29/789 |

\* cited by examiner

SEMICONDUCTOR DEVICE INCLUDING REPAIR STORAGE

CROSS-REFERENCE TO RELATED APPLICATION(S)

This application claims priority under 35 U.S.C. § 119 to Korean Patent Application No. 10-2022-0038190, filed on Mar. 28, 2022 in the Korean Intellectual Property Office, the disclosure of which is herein incorporated by reference in its entirety.

TECHNICAL FIELD

The present inventive concept relates to a semiconductor device and, more specifically, to a semiconductor device including a repair storage.

DISCUSSION OF THE RELATED ART

A semiconductor device may be implemented by packaging together a plurality of semiconductor dies, each of which providing different functions. Each of the semiconductor dies may include a plurality of memory cells for storing data used to execute a function, and the plurality of memory cells may be disposed in at least one memory block. If a bad cell is present among the plurality of memory cells, a repair operation may be performed to replace the bad cell with a redundant cell serving as a spare. In this case, pieces of repair information, including an address of the bad cell or the like to be repaired, may be stored in the semiconductor dies.

SUMMARY

A semiconductor device includes two or more semiconductor dies stacked on each other. Pieces of repair information required for a repair operation of each of the two or more semiconductor dies are stored in a storage included in one of the two or more semiconductor dies, to increase integration. The repair operation is performed before and after a bonding process of two or more semiconductor dies, respectively, to increase reliability.

A semiconductor device includes a first semiconductor die including a plurality of first memory blocks and a plurality of first repair registers respectively connected to the plurality of first memory blocks, and a second semiconductor die including a plurality of second memory blocks, a plurality of second repair registers respectively connected to the plurality of second memory blocks, and a repair storage in which first pieces of repair information for the plurality of first memory blocks and second pieces of repair information for the plurality of second memory blocks are stored. The first semiconductor die and the second semiconductor die are stacked on each other. When the semiconductor device is powered on, the plurality of first repair registers receive and store the first pieces of repair information from the repair storage, and the plurality of first memory blocks perform a repair operation based on the first pieces of repair information stored in the plurality of first repair registers.

A semiconductor device includes a plurality of memory blocks respectively including a plurality of memory cells, a plurality of repair registers respectively connected to the plurality of memory blocks, and a repair storage including non-volatile memory devices storing pieces of repair information. When the semiconductor device is powered on, each of the plurality of repair registers receives and stores a portion of pieces of repair information among the pieces of repair information, each of the plurality of memory blocks performs repair operation based on the portion of pieces of repair information, and the repair storage outputs remaining pieces of repair information, other than the portion of pieces of repair information, among the pieces of repair information externally.

A semiconductor device includes a plurality of memory blocks respectively including a plurality of memory cells, and a plurality of repair registers respectively connected to the plurality of memory blocks. Each of the plurality of repair registers stores pieces of repair information received externally through at least one pad among a plurality of pads and each of the plurality of memory blocks performs a repair operation based on the pieces of repair information.

BRIEF DESCRIPTION OF DRAWINGS

The above and other aspects and features of the present inventive concept will be more clearly understood from the following detailed description, taken in conjunction with the accompanying drawings, in which.

DETAILED DESCRIPTION

Hereinafter, example embodiments of the present inventive concept will be described with reference to the accompanying drawings.

Figure 1:
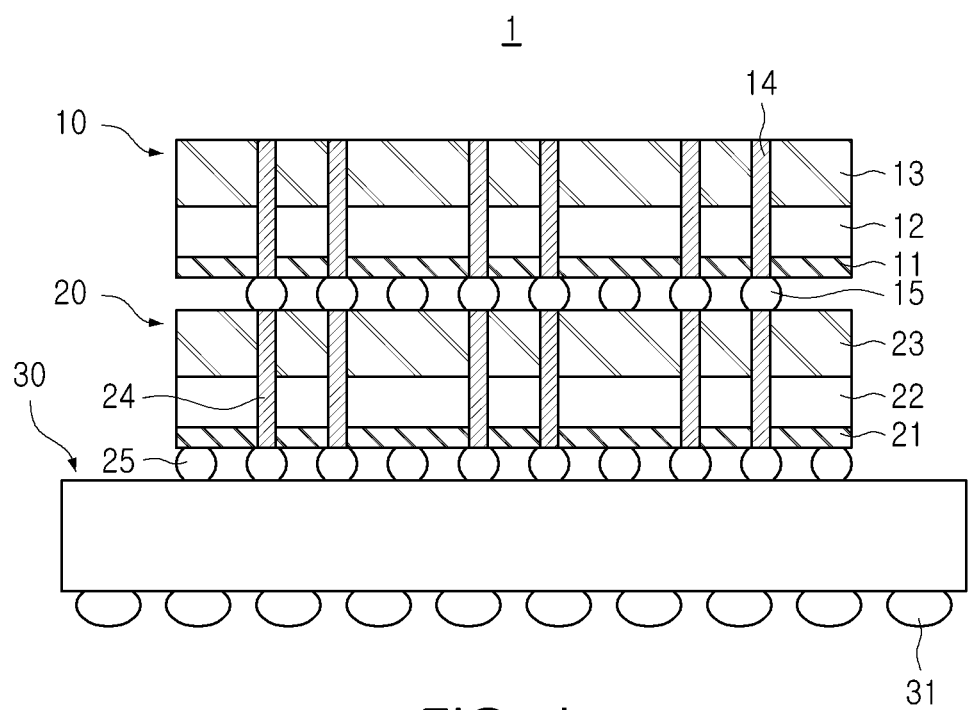
FIG. 1 is a view schematically illustrating a semiconductor device according to an embodiment of the present inventive concept.

FIG. 1 is a view schematically illustrating a semiconductor device according to an embodiment of the present inventive concept.

Referring to FIG. 1, a semiconductor device 1, according to an embodiment of the present inventive concept, may include a first semiconductor die 10, a second semiconductor die 20, a circuit board 30, and the like. The first semiconductor die 10 and the second semiconductor die 20 may each be stacked on the circuit board 30. For example, the second semiconductor die 20 may be mounted directly on the circuit board 30, and the first semiconductor die 10 may be stacked on the second semiconductor die 20.

The first semiconductor die 10 may include a first semiconductor substrate 11, a first device region 12 and a first interconnection region 13, formed on the first semiconductor substrate 11, and the like. The second semiconductor die 20 may have a structure, similar to a structure of the first semiconductor die 10, and may include a second semiconductor substrate 21, a second device region 22 and a second interconnection region 23, formed on the second semiconductor substrate 21, and the like.

A plurality of devices may be formed in each of the first device region 12 and the second device region 22. For example, each of the first device region 12 and the second device region 22 may include a plurality of transistors, and the plurality of transistors may be connected to each other by interconnection patterns formed in each of the first interconnection region 13 and the second interconnection region 23, to form a predetermined circuit. Each of the first interconnection region 13 and the second interconnection region 23 may include metal (or other electrically conductive) interconnections connecting the plurality of transistors to each other, and an interlayer insulating layer covering the metal interconnections.

The first semiconductor die 10 may include a plurality of first via structures 14 and a plurality of first die bumps 15, and the second semiconductor die 20 may include a plurality of second via structures 24 and a plurality of second die bumps 25. In an embodiment, each of the plurality of first via structures 14 and the plurality of second via structures 24 may be formed as a through-silicon via (TSV) passing through the first semiconductor substrate 11 and the second semiconductor substrate 21.

Circuits in the first semiconductor die 10 and circuits in the second semiconductor die 20 may be connected to each other through the plurality of first via structures 14, the plurality of first die bumps 15, the plurality of second via structures 24, and the plurality of second die bumps 25. Also, the circuits in the first semiconductor die 10 and the circuits in the second semiconductor die 20 may be connected to circuit patterns formed in the circuit board 30. The circuit patterns in the circuit board 30 may be electrically connected to bumps 31 on one surface of the circuit board 30.

The first semiconductor die 10 and the second semiconductor die 20 may provide different functions. For example, when the semiconductor device 1 is a system-on-chip (SOC), each of the first semiconductor die 10 and the second semiconductor die 20 may provide separate functions of a central processing unit (CPU), a graphic processing unit (GPU), a neural processing unit (NPU), MODEM, or the like. According to an embodiment, the semiconductor device 1 may further include a semiconductor die that may further be stacked on the first semiconductor die 10 and the second semiconductor die 20.

The first semiconductor die 10 and the second semiconductor die 20 may include at least one memory block, respectively, and the memory block may include a plurality of memory cells. For example, each of the memory cells included in the first semiconductor die 10 and the second semiconductor die 20 may be a static random access memory (SRAM) cell or a dynamic random access memory (DRAM) cell. According to an embodiment, the memory cells may be implemented as types of memory cells, other than the SRAM cell and the DRAM cell.

Due to problems that may arise in a manufacturing process or the like, one or more cells, among the memory cells included in the first semiconductor die 10 and/or the second semiconductor die 20, may be a bad cell that cannot operate normally. In preparation for the occurrence of the bad cell, each of the first semiconductor die 10 and the second semiconductor die 20 may include a redundancy cell that the bad cell may be replaced with. For each of the first semiconductor die 10 and the second semiconductor die 20, a repair operation determining whether the bad cell is present and replacing the bad cell with the redundancy cell may be performed.

For example, the repair operation may be performed when the semiconductor device 1 is booted (e.g., when the semiconductor device is powered on and/or when a host device connected to the semiconductor device boots up). Therefore, pieces of repair information, including address information or the like, of a bad cell may be stored in a non-volatile repair storage in which data is maintained regardless of whether the semiconductor device 1 is powered on or not. When the repair storage for storing pieces of repair information are provided in each of the first semiconductor die 10 and the second semiconductor die 20, a degree of integration of the first semiconductor die 10 and the second semiconductor die 20 may be deteriorated Therefore, in an embodiment of the present inventive concept, the pieces of repair information of the first semiconductor die 10 and the second semiconductor die 20 may be stored in the repair storage provided in one of the first semiconductor die 10 and the second semiconductor die 20. For example, when the repair storage is provided in only the second semiconductor die 20, the semiconductor device 1 is booted, and a repair operation is started, the repair storage may provide the pieces of repair information previously stored in the first semiconductor die 10 through the plurality of first via structures 14 and the plurality of second via structures 24. Therefore, the degree of integration of the semiconductor device 1 may be increased.

Figure 2:
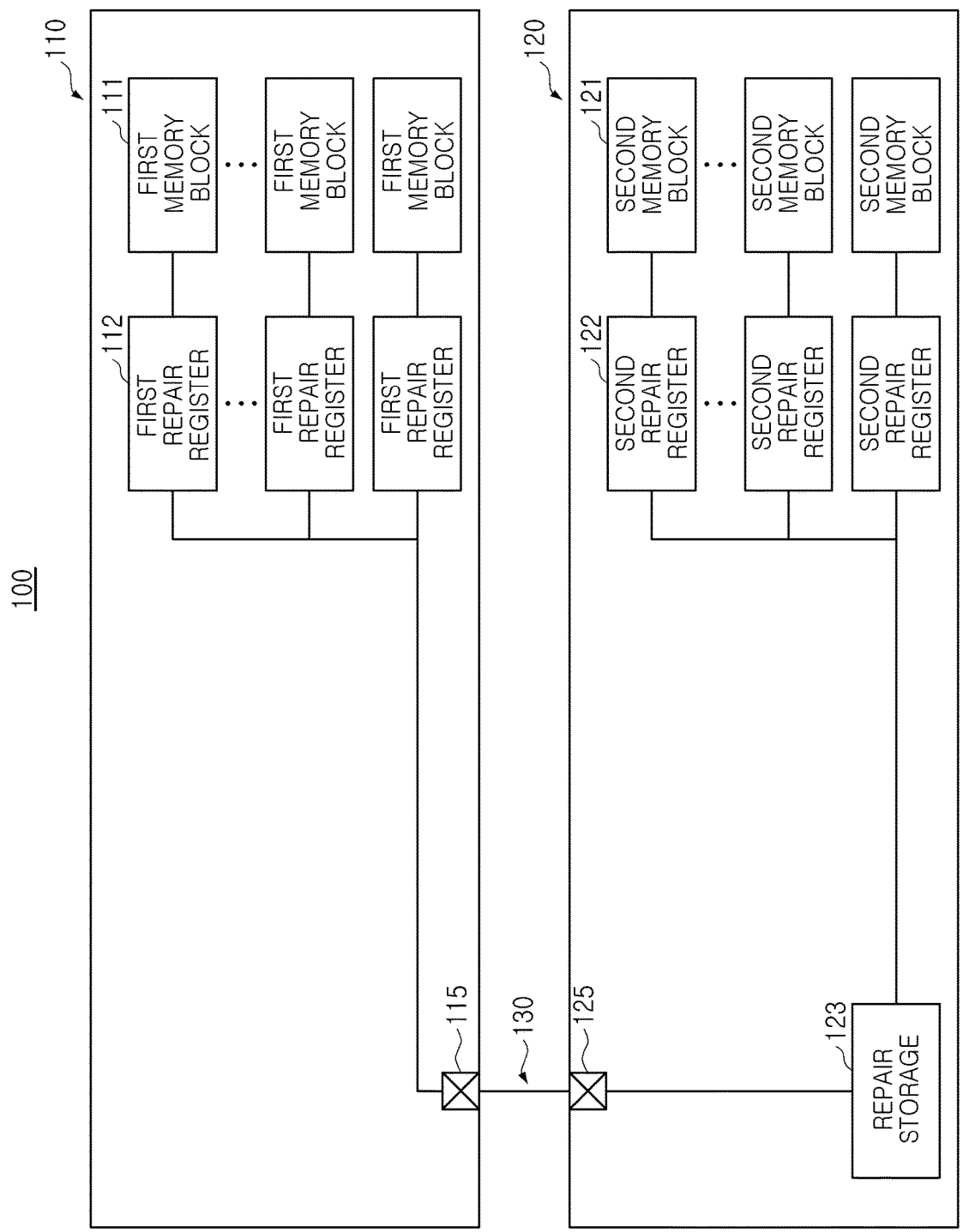
FIGS. 2 and 3 are block diagrams schematically illustrating a semiconductor device according to an embodiment of the present inventive concept.
Figure 3:
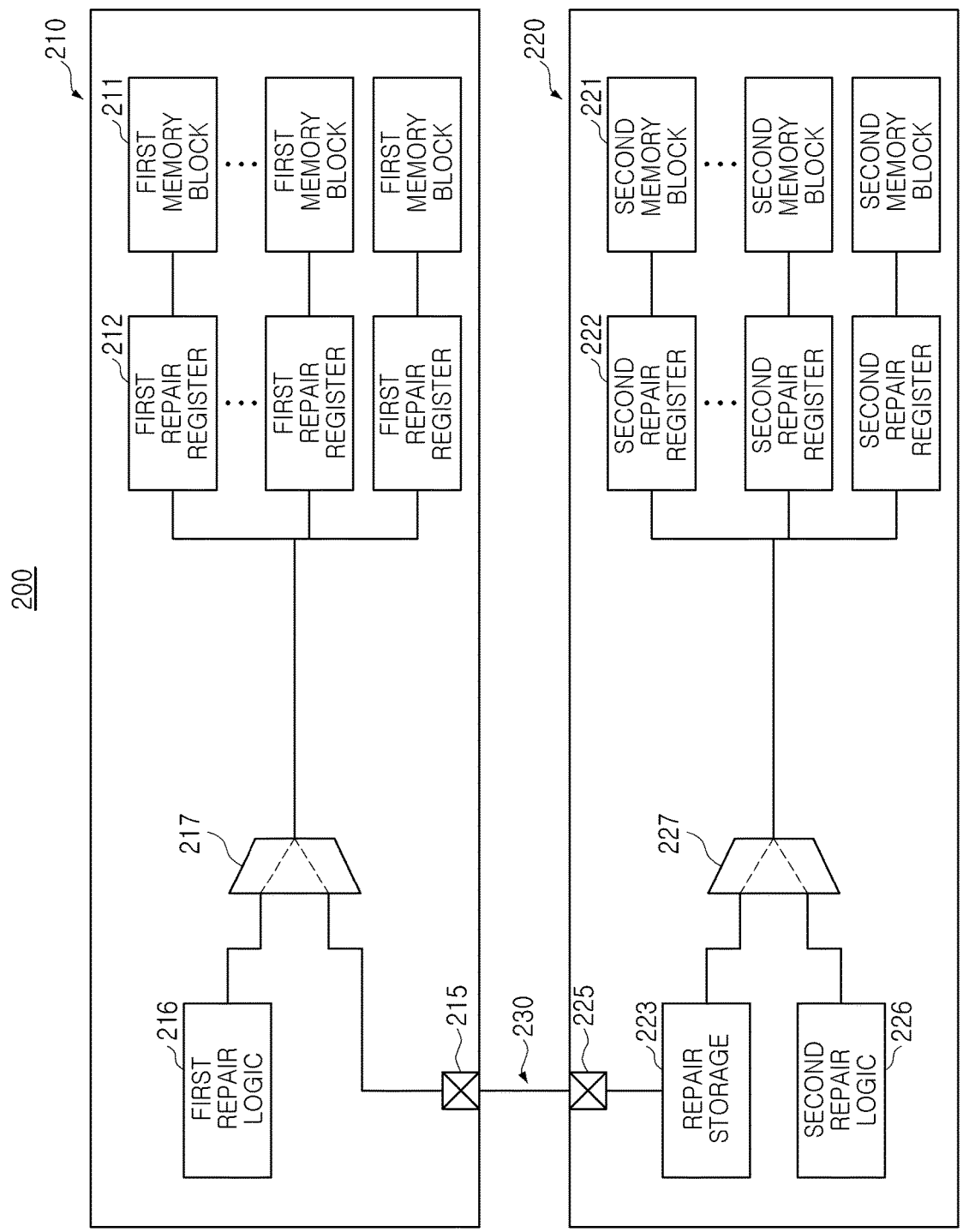

FIGS. 2 and 3 are block diagrams schematically illustrating a semiconductor device according to an embodiment of the present inventive concept.

First, referring to FIG. 2, a semiconductor device 100, according to an embodiment of the present inventive concept, may include a first semiconductor die 110 and a second semiconductor die 120. The first semiconductor die 110 and the second semiconductor die 120 may be connected to each other by a connection structure 130. For example, the connection structure 130 connecting the first semiconductor die 110 and the second semiconductor die 120 to each other may be a through-silicon via, as described above with reference to FIG. 1. According to an embodiment, the connection structure 130 may be a wire as opposed to the through-silicon via described above, or the like. The connection structure 130 may be connected between a first pad 115 of the first semiconductor die 110 and a second pad 125 of the second semiconductor die 120.

The first semiconductor die 110 may include a plurality of first memory blocks 111, a plurality of first repair registers 112 respectively connected to the plurality of first memory blocks 111, and the like. The plurality of first memory blocks 111 may include a plurality of memory cells and a plurality of redundancy cells, connected to a plurality of rows and a plurality of columns.

In an embodiment, the plurality of rows corresponds to a plurality of row lines, and the plurality of columns may correspond to a plurality of column lines. The plurality of memory cells and the plurality of redundancy cells may share the plurality of column lines. In addition, the plurality of memory cells may be connected to a plurality of word lines, among the plurality of row lines, and the plurality of redundancy cells may be connected to a plurality of redundancy lines, among the plurality of row lines.

In a repair operation of the first semiconductor die 110, each of the plurality of first memory blocks 111 may determine whether a bad cell is present among the plurality of memory cells. When a bad cell is present therein, the bad cell may be replaced with one of the plurality of redundancy cells. For example, the repair operation may include an operation of replacing at least one word line to which the bad cell is connected, among the plurality of word lines, with one of the plurality of redundancy lines.

The second semiconductor die 120 may include a plurality of second memory blocks 121, a plurality of second repair registers 122 respectively connected to the plurality of second memory blocks 121, a repair storage 123, and the like. A configuration and operation of each of the plurality of second memory blocks 121 and the plurality of second repair registers 122 may be similar to that described for the first semiconductor die 110.

The repair storage 123 may provide a memory region in which pieces of repair information are stored. The pieces of repair information may include information for a repair operation of each of the first semiconductor die 110 and the second semiconductor die 120. For example, the pieces of repair information may include address information indicating a location of a bad cell existing in the plurality of first memory blocks 111 and the plurality of second memory blocks 121.

The pieces of repair information may be generated before shipping the semiconductor device 100, and may be stored in the repair storage 123. For example, pieces of repair information generated after performing a bonding process of connecting the first semiconductor die 110 and the second semiconductor die 120 to each other by the connection structure 130 may be stored in the repair storage 123. For example, after performing a bonding process, first pieces of repair information generated by the plurality of first memory blocks 111 by performing a repair operation, and second pieces of repair information generated by the plurality of second memory blocks 112 by performing the repair operation may be stored in the repair storage.

After shipping the semiconductor device 100, when the semiconductor device 100 is booted, a repair operation may be performed. In an embodiment, a repair operation may be performed whenever the semiconductor device 100 is booted. When the semiconductor device 100 starts booting, the plurality of first repair registers 112 may receive and store first pieces of repair information from the repair storage 123 through the connection structure 130. The plurality of first memory blocks 111 may perform a repair operation of replacing bad cells with redundancy cells, with reference to the first pieces of repair information loaded into the plurality of first repair registers 112. Second pieces of repair information stored in the repair storage 123 may be stored in the plurality of second repair registers 122, and the plurality of second memory blocks 121 may perform a repair operation using the second pieces of repair information loaded in the plurality of second repair registers 122. In the repair operation using the first pieces of repair information and the second pieces of repair information, the plurality of first memory blocks 111 and the plurality of second memory blocks 121 may replace bad cells with redundancy cells, and may include a test operation determining whether a normal operation is being performed.

Each of the plurality of first repair registers 112 and the plurality of second repair registers 122 may include a plurality of flip-flops storing pieces of repair information. Therefore, in a state in which the semiconductor device 100 is powered off, the pieces of repair information may be deleted from the plurality of first repair registers 112 and the plurality of second repair registers 122. When booting of the semiconductor device 100 is restarted, the pieces of repair information stored in the repair storage 123 may be stored again in the plurality of first repair registers 112 and the plurality of second repair registers 122.

For example, the first semiconductor die 110 may include a first logic region, and the second semiconductor die 120 may include a second logic region. Circuits implemented in the first logic region may perform various operations using data stored in the plurality of first memory blocks 111. Circuits included in the second logic region may provide various functions using data stored in the plurality of second memory blocks 121. For example, the first logic region and the second logic region may provide different functions.

Next, referring to FIG. 3, a semiconductor device 200, according to an embodiment of the present inventive concept, may include a first semiconductor die 210 and a second semiconductor die 220. The first semiconductor die 210 and the second semiconductor die 220 may be connected to each other through a connection structure 230 between a first pad 215 and a second pad 225.

In a similar manner to those previously described with reference to FIG. 2, the first semiconductor die 210 may include a plurality of first memory blocks 211 and a plurality of first repair registers 212, and the second semiconductor die 220 may include a plurality of second memory blocks 221 and a plurality of second repair registers 222. The second semiconductor die 220 may include a repair storage 223 in which pieces of repair information are stored.

As illustrated in FIG. 3, the first semiconductor die 210 may include a first repair logic 216 and a first select circuit 217, and the second semiconductor die 220 may include a second repair logic 226 and the second select circuit 227. Each of the first repair logic 216 and the second repair logic 226 may control the plurality of first memory blocks 211 and the plurality of second memory blocks 221 to perform a repair operation, even in a state in which pieces of repair information are not stored in the plurality of first repair registers 212 and the plurality of second repair registers 222.

As the first semiconductor die 210 is illustrated, when the plurality of first memory blocks 211 perform a repair operation to select bad cells and redundancy cells to be replaced with the bad cells, pieces of repair information including address information of the bad cells may be stored in the plurality of first repair registers 212 by the first repair logic 216. The plurality of first memory blocks 211 may use the pieces of repair information stored in the plurality of first repair registers 212 to determine whether a normal operation is possible after the bad cells are replaced with the redundancy cells by the repair operation.

Even before the first semiconductor die 210 and the second semiconductor die 220 are bonded, and the semiconductor device 200 receives power to start an operation, the plurality of first memory blocks 211 and the plurality of second memory blocks 221 may perform the repair operation by the first repair logic 216 and the second repair logic 226, respectively. When the first repair logic 216 and the second repair logic 226 are not included, a repair operation in each of the first semiconductor die 210 and the second semiconductor die 220 may be performed by an external device connected to the first semiconductor die 210 and the second semiconductor die 220. When the repair operation is being performed by each of the first repair logic 216 and the second repair logic 226, the first select circuit 217 and the second select circuit 227 may connect the first repair logic 216 to the plurality of first repair registers 212 and may connect the second repair logic 226 to the plurality of second repair registers 222, respectively.

A repair operation after the first semiconductor die 210 and the second semiconductor die 220 are bonded to each other and connected to each other by the connection structure 230 may also be performed by the first repair logic 216 and the second repair logic 226. Each of the first repair logic 216 and the second repair logic 226 may perform a repair operation without pieces of repair information, and may store pieces of repair information including address information of a bad cell in the repair storage 223.

When pieces of repair information are stored in the repair storage 223, the pieces of repair information may be loaded into the plurality of first repair registers 212 and the plurality of second repair registers 222, to perform a repair operation again. In this case, the repair operation may include a test operation in which the plurality of first memory blocks 211 and the plurality of second memory blocks 221 replace bad cells with redundancy cells and determine whether a normal operation is being performed. If there is a memory block that does not operate normally in the repair operation using the pieces of repair information, the semiconductor device 200 may be determined as a failure.

During the repair operation using the pieces of repair information, each of the first select circuit 217 and the second select circuit 227 may connect an output terminal of the repair storage 223 to the plurality of first repair registers 212 and the plurality of second repair registers 222. The repair storage 223 may output a portion of pieces of repair information to the plurality of second repair registers 222, and may output remaining repair information to the plurality of first repair registers 212. The portion of pieces of repair information may be information generated by the second repair logic 226, and the remaining pieces of repair information may be information generated by the first repair logic 216.

Figure 4:
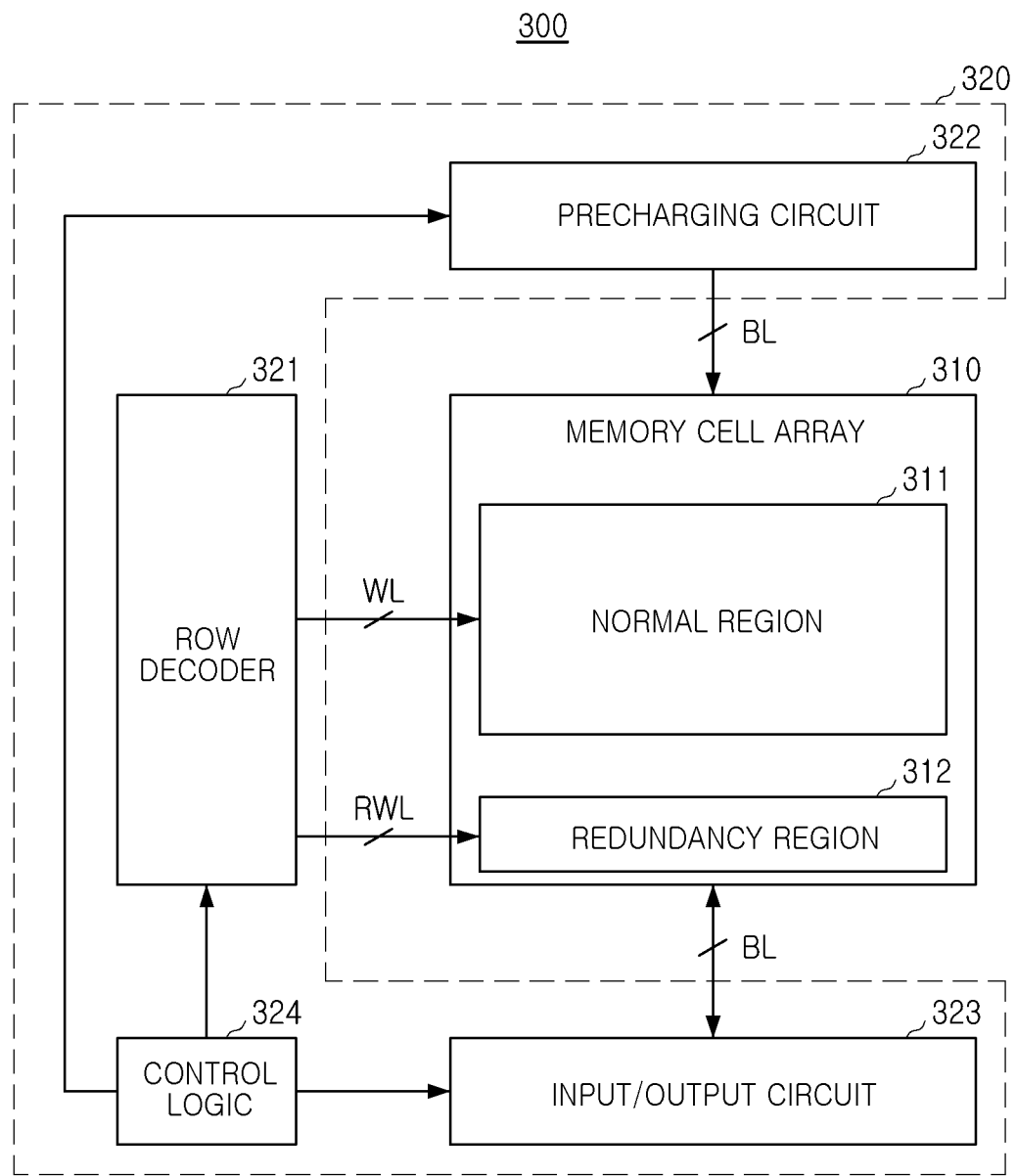
FIG. 4 is a view schematically illustrating a memory block included in a semiconductor device according to an embodiment of the present inventive concept.

FIG. 4 is a view schematically illustrating a memory block included in a semiconductor device according to an embodiment of the present inventive concept.

Referring to FIG. 4, a memory block 300 included in a semiconductor die, according to an embodiment of the present inventive concept, may include a cell region in which a memory cell array 310 is disposed, a peripheral circuit region 320, and the like. The memory cell array 310 may include a normal region 311 and a redundancy region 312, a plurality of memory cells may be disposed in the normal region 311, and a plurality of redundancy cells may be disposed in the redundancy region 312.

The peripheral circuit region 320 may include a row decoder 321, a precharging circuit 322, an input/output circuit 323, a control logic 324, and the like. The row decoder 321 may be connected to the normal region 311 through a plurality of word lines WL, and may be connected to the redundancy region 312 through a plurality of redundancy lines RWL. The precharging circuit 322 and the input/output circuit 323 may be connected to the memory cell array 310 through a plurality of bit lines BL, and the precharging circuit 322 may perform a precharging operation of charging at least one selected bit line among the bit lines BL for a write operation, a read operation, or the like.

The control logic 324 may control the row decoder 321, the precharging circuit 322, and the input/output circuit 323. For example, the control logic 324 may control the row decoder 321 to determine at least one of the plurality of word lines WL as a selected word line, and a write operation, a read operation, or the like may be performed on at least one of the memory cells connected to the selected word line through at least one selected bit line among the plurality of bit lines BL.

In addition, the control logic 324 may execute a test operation and a repair operation in response to a command received externally. For example, the control logic 324 may perform a test operation on the plurality of memory cells included in the normal region 311, and may, as a result, determine a bad cell in which a write operation, a read operation, or the like is not normally executed. The control logic 324 may determine whether the memory block 300 operates normally by executing a repair operation of replacing the bad cell determined in the test operation with a redundancy cell, and executing the test operation again to determine whether the memory block 300 operates normally.

When the bad cell is not replaced with the redundancy cell, for example, when the number of bad cells is greater than the number of redundancy cells, the control logic 324 may determine the memory block 300 as a final failure. Alternatively, when it is difficult to ensure a normal operation despite replacing the bad cell with the redundancy cell, the control logic 324 may also determine the memory block 300 as a final failure. For example, before a semiconductor die including the memory block 300 is bonded to another semiconductor die, the memory block 300 may be determined as a final failure, to increase yield and reliability of a semiconductor device including two or more semiconductor dies.

Figure 5:
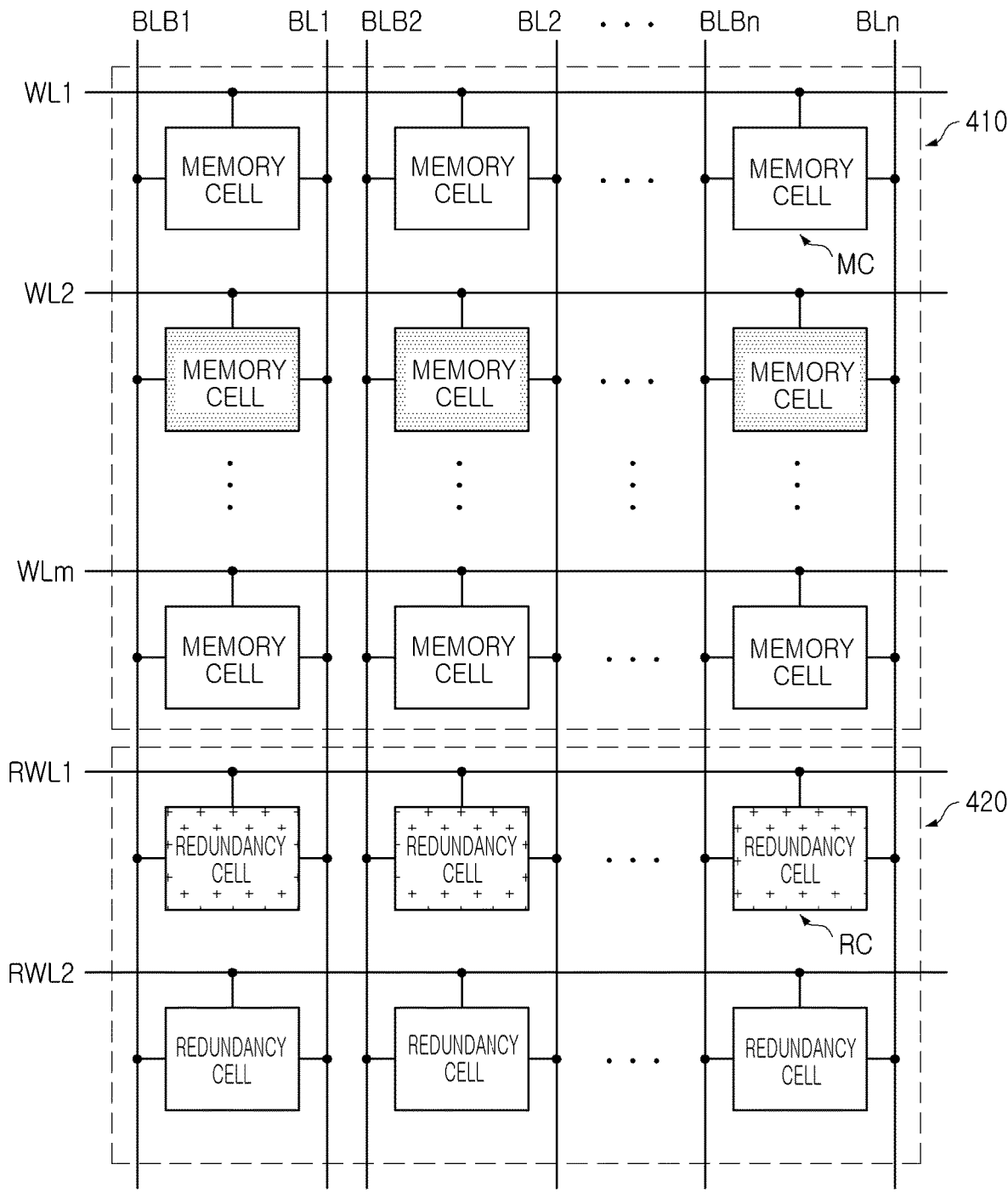
FIG. 5 is a view schematically illustrating a memory cell array included in a memory block in a semiconductor device according to an embodiment of the present inventive concept.
Figure 6:
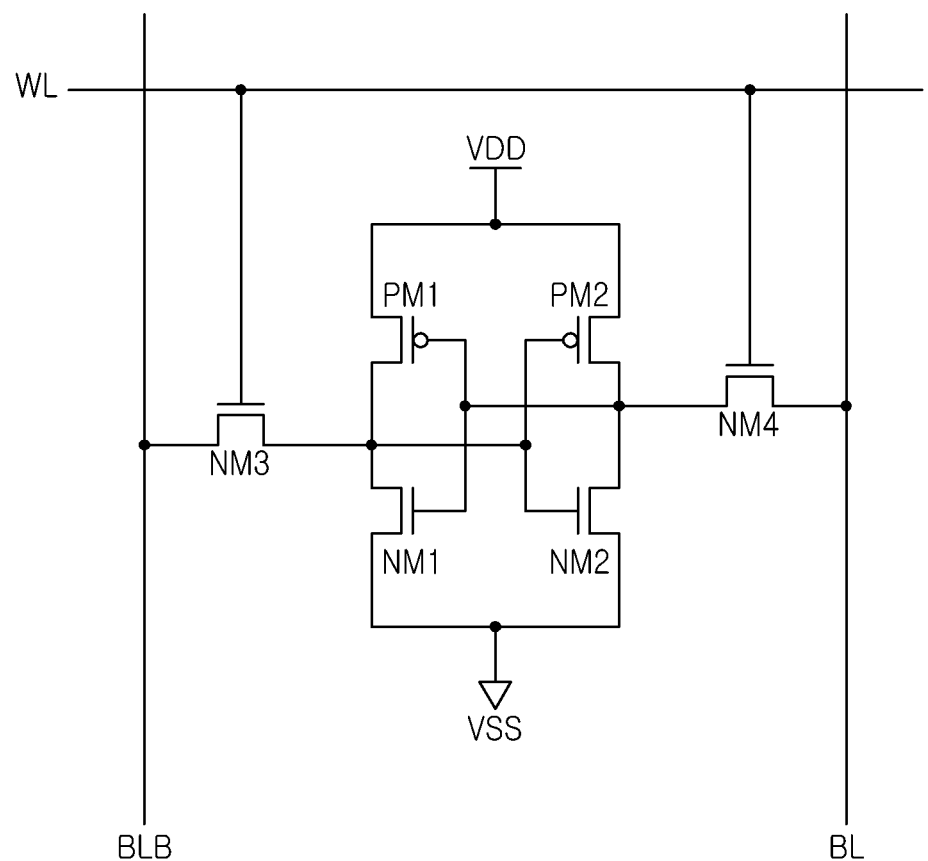
FIG. 6 is a view schematically illustrating a memory cell included in a memory block in a semiconductor device according to an embodiment of the present inventive concept.

FIG. 5 is a view schematically illustrating a memory cell array included in a memory block in a semiconductor device according to an embodiment of the present inventive concept. FIG. 6 is a view schematically illustrating a memory cell included in a memory block in a semiconductor device according to an embodiment of the present inventive concept.

Referring to FIG. 5, a memory cell array 400 may include a normal region 410 and a redundancy region 420. The normal region 410 may include a plurality of memory cells MC, and the plurality of memory cells MC may be connected to a plurality of word lines WL1-WLm and a plurality of bit lines BL1-BLn and BLB1-BLBn. The redundancy region 420 may include a plurality of redundancy cells RC, and the plurality of redundancy cells RC may be connected to a plurality of redundancy lines RWL1-RWL2 and the plurality of bit lines BL1-BLn and BLB1-BLBn.

In an embodiment illustrated in FIG. 5, the plurality of memory cells MC and the plurality of redundancy cells RC may share the plurality of bit lines BL1-BLn and BLB1-BLBn. Each of the plurality of memory cells MC and the plurality of redundancy cells RC may be connected to a pair of bit lines among the plurality of bit lines BL1-BLn and BLB1-BLBn, and the pair of bit lines may provide a transmission path for signals having complementary characteristics.

For example, each of the plurality of memory cells MC may be an SRAM cell or a DRAM cell, and the plurality of redundancy cells RC may have the same structure as the plurality of memory cells MC. Referring to FIG. 6, a plurality of memory cells MC and a plurality of redundancy cells RC may have an SRAM cell structure, respectively. The SRAM cell may include a pair of inverters and a pair of switch devices.

In an embodiment illustrated in FIG. 6, a first PMOS device PM1 and a first NMOS device NM1 may be provided as a first inverter, and a second PMOS device PM2 and a second NMOS device NM2 may be provided as a second inverter. An output terminal of the first inverter may be connected to an input terminal of the second inverter, and an output terminal of the second inverter may be connected to an input terminal of the first inverter. In addition, a third NMOS device NM3 providing a first switch device may be connected between the input terminal of the second inverter and a complementary bit line BLB, and a fourth NMOS device NM4 providing a second switch device may be connected between the input terminal of the first inverter and a bit line BL.

A gate of the third NMOS device NM3 and a gate of the fourth NMOS device NM4 may be commonly connected to a word line WL. When the third NMOS device NM3 and the fourth NMOS device NM4 are turned on by a voltage to be input to the word line WL, data may be stored in the SRAM cell by voltages to be input to the complementary bit line BLB and the bit line BL. In addition, in a state in which the third NMOS device NM3 and the fourth NMOS device NM4 are turned on, the data stored in the SRAM cell may be read through the complementary bit line BLB and the bit line BL.

Referring back to FIG. 5, in a memory block including the memory cell array 400, a test operation for determining whether a bad cell is present among the plurality of memory cells MC may be performed. The test operation may be performed on a wafer level before a semiconductor die including the memory cell array 400 is separated from a wafer. In addition, the test operation may be performed even after the semiconductor die is separated from the wafer and/or after the semiconductor die is combined with another semiconductor die and manufactured as a single semiconductor device such as a system-on-chip or the like.

For example, when at least one of the memory cells MC connected to a second word line WL2 is determined to be a bad cell in the test operation, the memory block including the memory cell array 400 may perform a repair operation of replacing the bad cell with a redundancy cell RC. In an embodiment illustrated in FIG. 5, the second word line WL2 to which the bad cell is connected may be replaced with a first redundancy line RWL1 by the repair operation. Therefore, the memory block may operate normally while maintaining a storage space of the memory cell array 400 as it is.

Upon completion of the repair operation, the memory block may re-execute the test operation. For example, when receiving a command instructing a write operation on the memory cells MC connected to the second word line WL2, the memory block may perform a write operation on redundancy cells RC connected to the first redundancy line RWL1. When data is normally programmed into the redundancy cells RC connected to the first redundancy line RWL1, the memory block may determine that the repair operation is successfully completed and the test operation may be terminated.

According to an embodiment, an error may occur in the test operation even after the repair operation is completed. For example, when bad cells are also present in the redundancy cells RC connected to the first redundancy line RWL1, the memory block might not pass the test operation after the repair operation. In this case, the memory block may perform a repair operation in which the memory cells MC connected to the second word line WL2 are replaced with redundancy cells RC connected to a second redundancy line RWL2. When bad cells are also present in the redundancy cells RC connected to the second redundancy line RWL2, the memory block may be determined as a final failure.

As described above with reference to FIGS. 2 and 3, a semiconductor die including the memory cell array 400 may or might not include a repair storage for storing pieces of repair information, depending on a type of the semiconductor die. When the semiconductor die includes the repair storage, the semiconductor die may store pieces of repair information in the repair storage. For example, the pieces of repair information may include address information of a second word line WL2 connected to a bad cell in the memory cell array 400, address information of a first redundancy line RWL1 replacing the second word line WL2, or the like.

When the semiconductor die does not include the repair storage, the memory block might not store pieces of repair information. When a test operation and a repair operation are performed after the semiconductor die is coupled to the other semiconductor die including the repair storage, the semiconductor die may store pieces of repair information in a repair storage included in the other semiconductor die.

Figure 7:
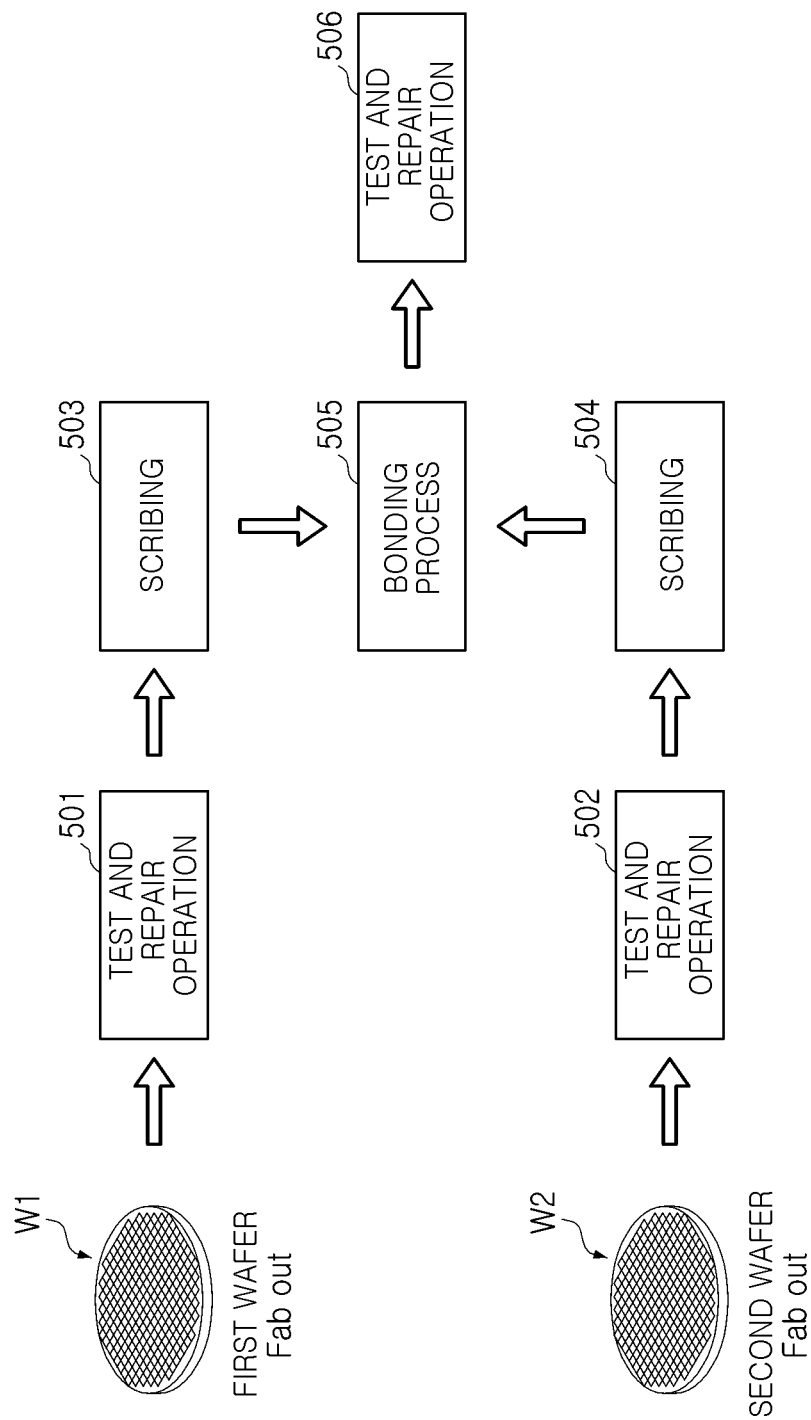
FIG. 7 is a view illustrating a process of manufacturing a semiconductor device according to an embodiment of the present inventive concept.

FIG. 7 is a view illustrating a process of manufacturing a semiconductor device according to an embodiment of the present inventive concept.

Referring to FIG. 7, a process of manufacturing a semiconductor device, according to an embodiment, may start with manufacturing a plurality of semiconductor dies on each of a first wafer W1 and a second wafer W2. For example, a plurality of first semiconductor dies manufactured on the first wafer W1 and a plurality of second semiconductor dies manufactured on the second wafer W2 are combined with each other, to provide a semiconductor device such as a system-on-chip, an application processor, and the like.

Also, the plurality of first semiconductor dies and the plurality of second semiconductor dies may have different structures. For example, each of the plurality of first semiconductor dies and the plurality of second semiconductor dies may include a plurality of memory blocks, and each of the plurality of second semiconductor dies may include a storage in which stored data is maintained even after power is off. The storage included in each of the plurality of second semiconductor dies may be used as a repair storage for recording pieces of repair information of each of the plurality of memory blocks.

When each of the first wafer W1 and the second wafer W2 is finished being fabricated (e.g., "fab out"), test and repair operations 501 and 502 may be performed. For example, the test and repair operations 501 and 502 are performed on a wafer level before separating the plurality of first semiconductor dies and the plurality of second semiconductor dies from each of the first wafer W1 and the second wafer W2. The test and repair operations 501 and 502 may include an operation of testing whether the plurality of memory blocks included in each of the plurality of first semiconductor dies and the plurality of second semiconductor dies operate normally, and an operation of replacing a bad cell with a redundancy cell, when the bad cell is detected.

Power may be supplied to the plurality of first semiconductor dies and the plurality of second semiconductor dies for the test and repair operations 501 and 502. When the plurality of first semiconductor dies and the plurality of second semiconductor dies include a repair logic, each of the plurality of first semiconductor dies and the plurality of second semiconductor dies may receive the power to independently perform the test and repair operations 501 and 502.

When the plurality of first semiconductor dies and the plurality of second semiconductor dies do not include the repair logic, the test and repair operations 501 and 502 may be performed by an external device connected to the first wafer W1 and the second wafer W2. For example, the repair operation may be performed by inputting pieces of repair information to each of the plurality of first semiconductor dies and the plurality of second semiconductor dies by an external device.

When the test and repair operations 501 and 502 are completed, scribing processes 503 and 504 may be performed on the first wafer W1 and the second wafer W2, respectively, to obtain the plurality of first semiconductor dies and the plurality of second semiconductor dies. Thereafter, the first semiconductor die and the second semiconductor die may be connected in a bonding process 505. For example, the first semiconductor die and the second semiconductor die may be vertically stacked with each other and may be communicatively connected to each other by a through-silicon via or the like. Some dies that do not pass the test and repair operations 501 and 502 may be determined as a failure, and might not be input to the bonding process 505.

When the bonding process 505 is completed, a test and repair operation 506 may be executed again. In the test and repair operation 506 after the bonding process 505, a repair storage included in one of the first semiconductor die or the second semiconductor die may be used. For example, each of the first semiconductor die and the second semiconductor die may perform a test operation of finding a bad cell and a repair operation of replacing the bad cell with a redundancy cell, and store pieces of repair information generated in the repair operation in the repair storage. Thereafter, the pieces of repair information stored in the repair storage may be loaded to perform a test operation again, to finally check whether the semiconductor device after the repair operation operates normally.

According to an embodiment described with reference to FIG. 7, in a process of manufacturing a semiconductor device including a first semiconductor die and a second semiconductor die, the test and repair operations 501 and 502 before the bonding process 505 may be performed to find a die having a bad cell for which the repair operation does not correct the defects. Yield and reliability of the semiconductor device may be increased by finding a die having a bad cell of which coupling is not resolved even by a repair operation and not putting the die in the bonding process 505.

Also, according to an embodiment of the present inventive concept, a repair storage for storing pieces of repair information may be provided in only some of semiconductor dies included in a semiconductor device. Therefore, it is possible to increase a degree of integration of the semiconductor device and reduce the manufacturing cost of semiconductor dies.

Figure 8:
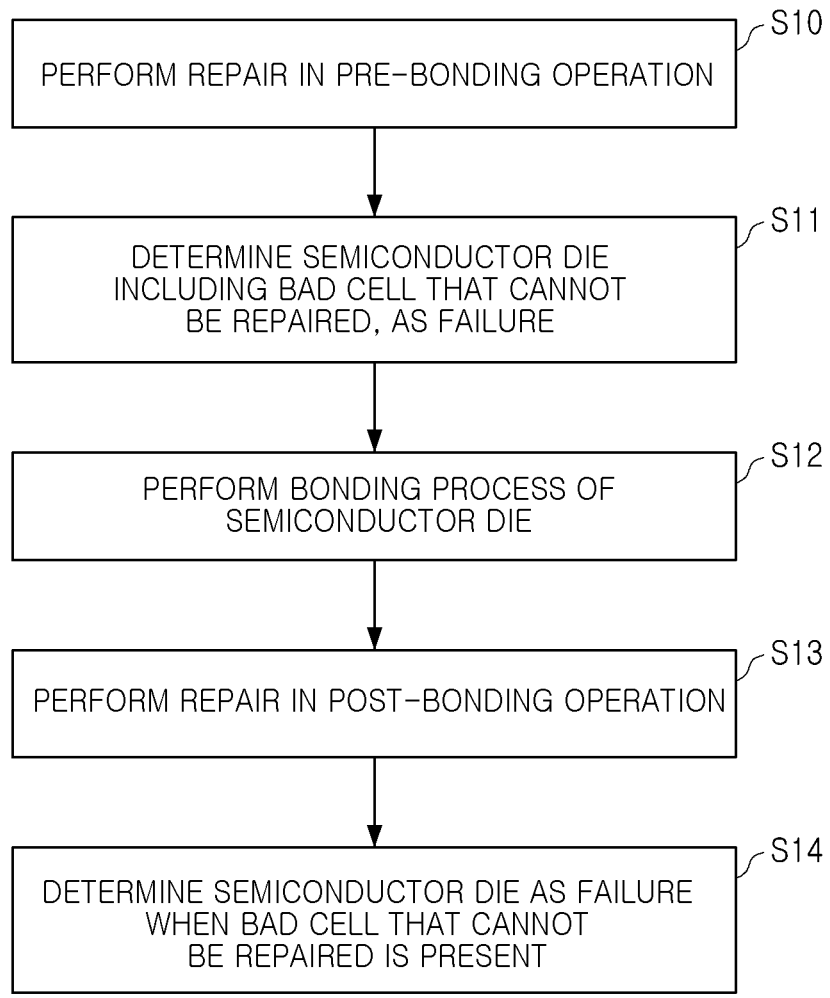
FIGS. 8 to 10 are flowcharts illustrating a repair operation of a semiconductor device according to an embodiment of the present inventive concept.
Figure 9:
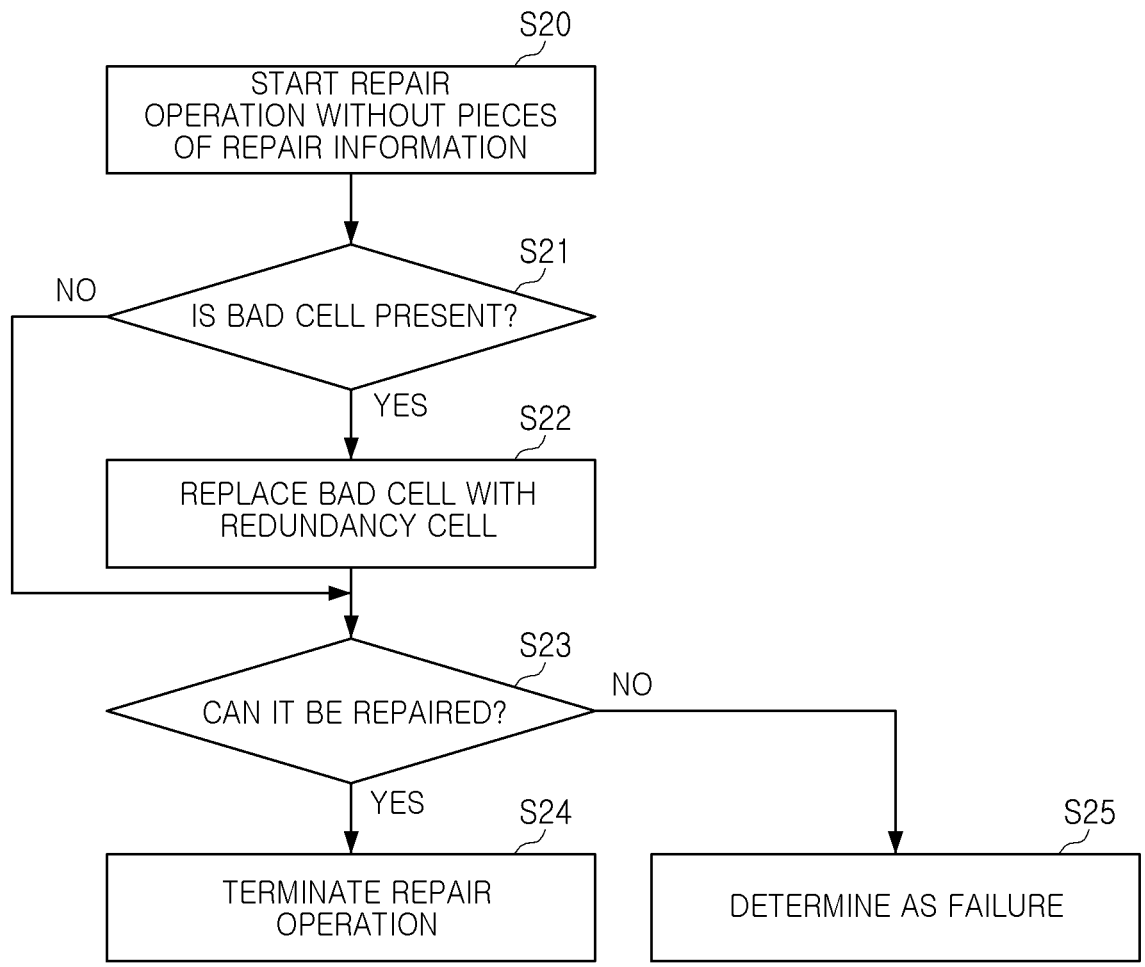
Figure 10:
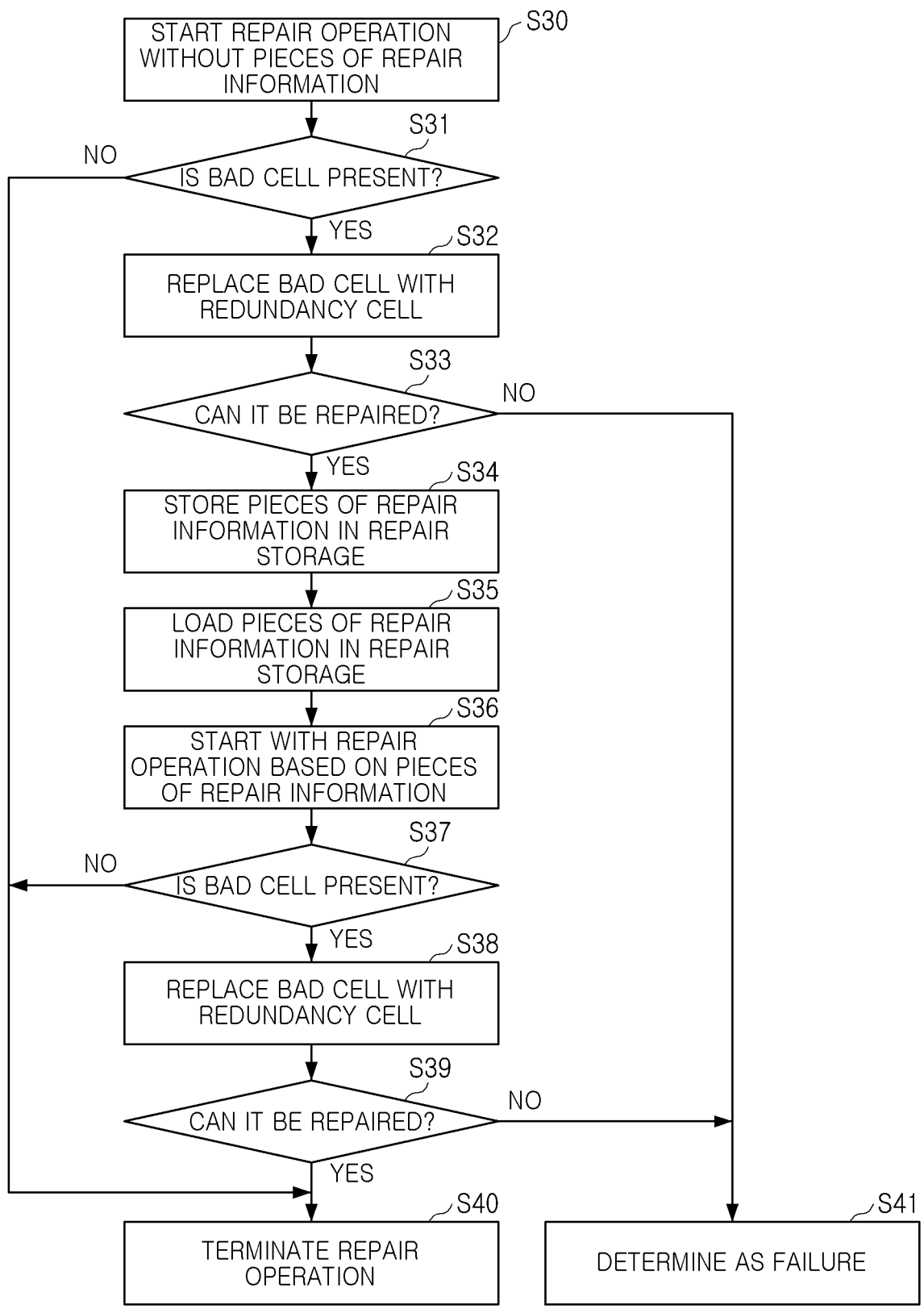

FIGS. 8 to 10 are flowcharts illustrating a repair operation of a semiconductor device according to an embodiment of the present inventive concept.

Referring first to FIG. 8, a repair operation of a semiconductor, device according to an embodiment of the present inventive concept, may be started by performing repair in a pre-bonding operation (S10). The pre-bonding operation may refer to an operation that is performed before a bonding process of connecting and bonding two or more semiconductor dies included in a semiconductor device to each other.

When a semiconductor die including a bad cell that cannot be repaired is present in a repair operation performed in S10, the semiconductor die may be determined as a failure (S11). The semiconductor die determined as a failure in S11 might not be put into a subsequent process. Therefore, it is possible to prevent, in advance, a case in which a semiconductor die having a bad cell that cannot be repaired is put into a bonding process and the semiconductor device is finally determined as a failure.

When semiconductor dies having a bad cell that cannot be repaired are filtered, a bonding process of connecting and bonding the semiconductor dies may be performed (S12), and a semiconductor device may be manufactured by the bonding process. When the semiconductor device is manufactured, repair may be performed in a post-bonding operation after the bonding process (S13). The repair of S13 may be performed in the semiconductor device, and for example, a repair operation may be performed on each of the semiconductor dies included in the semiconductor device.

Even when the semiconductor die having the bad cells is filtered in S11, bad cells that cannot be repaired may be present in the semiconductor device due to defects that may occur in the bonding process. Therefore, when a bad cell that cannot be repaired is found in the repair operation performed in S13, the semiconductor device may be determined as a failure (S14), and might not be put into a subsequent process or might not be shipped.

FIG. 9 is a flowchart illustrating a repair operation in a pre-bonding operation in more detail. The repair operation described with reference to FIG. 9 may be performed in units of semiconductor dies, and for example, may be performed on a wafer level before the semiconductor dies are separated from each other by a scribing process.

Referring to FIG. 9, a repair operation may start without separate pieces of repair information (S20). Pieces of repair information may include address information of a bad cell existing in a plurality of memory blocks included in a semiconductor die, address information of a redundancy cell to be replaced with the bad cell, or the like, and a repair operation described with reference to FIG. 9 may start without separate pieces of repair information.

The repair operation may first start with a test operation for determining whether a bad cell is present. When a bad cell is present as a result of the test operation (S21), an operation of replacing the bad cell with a redundancy cell may be performed (S22). As an example, as described above with reference to FIG. 5, the bad cell may be replaced with the redundancy cell by an operation of replacing a word line to which the bad cell is connected with a redundancy line, or other operations. When a bad cell is not present, the repair operation may be terminated without a separate operation (S24).

Next, it is possible to determine whether the bad cell can be repaired by performing a write operation, a read operation, or the like on the redundancy cell replacing the bad cell, and testing whether the redundancy cell operates normally (S23). When it is determined in S23 that repair of replacing the bad cell with the redundancy cell is possible, the repair operation for the semiconductor die on a wafer level may be terminated (S24). When the redundancy cell replaced for the bad cell in S23 does not pass the test operation, the semiconductor die may be ultimately determined as a failure, and might not be input to a subsequent process (S25).

FIG. 10 is a flowchart illustrating a repair operation in a post-bonding operation in more detail. The repair operation described with reference to FIG. 10 may be performed in units of semiconductor device having two or more semiconductor dies connected to each other. In an embodiment, at least some of the semiconductor dies included in the semiconductor device may be vertically stacked, and may be connected by a through-silicon via or the like.

Referring to FIG. 10, a repair operation in a post-bonding operation may start without separate pieces of repair information (S30). The repair operation may first start with a test operation for determining whether a bad cell is present, and when a bad cell is present (S31), the bad cell may be replaced with a redundancy cell (S32). When a bad cell is not present, the repair operation may be terminated without a separate operation (S40).

Next, it is possible to determine whether the bad cell can be repaired by performing a write operation, a read operation, or the like on the redundancy cell replacing the bad cell, and testing whether the redundancy cell operates normally (S33). When it is determined in S33 that repair of replacing the bad cell with the redundancy cell is impossible, the semiconductor device may be determined as a failure (S41). A semiconductor device to which a repair operation described with reference to FIG. 10 is applied may be manufactured by a bonding process using semiconductor dies on which the repair operation on a wafer level described with reference to FIG. 9 has been completed. Due to defects that may occur in the bonding process, bad cells that cannot be repaired may be present in at least some of the semiconductor dies, and in this case, the semiconductor device may be determined as a failure.

When the redundancy cell replacing the bad cell passes the test operation, it is determined that repair of the bad cell is possible, and pieces of repair information may be stored in a repair storage (S34). Therefore, pieces of repair information generated by a repair operation performed while a repair register is empty may be stored in the repair storage. The repair storage may be included in the semiconductor device and may be included only in some of the semiconductor dies connected to each other, and may include memory devices having non-volatile characteristics that maintain stored data even when power is off. Therefore, pieces of repair information now stored in the repair story in S34 may be maintained without loss, even in a state in which power supply to the semiconductor device is off.

For example, when a semiconductor device includes a plurality of semiconductor dies, a repair storage may be included in only a semiconductor die. Since the plurality of semiconductor dies are connected to communicate with each other, all pieces of repair information generated by each of the plurality of semiconductor dies may be stored in a repair storage. Therefore, in some semiconductor dies, circuits having different functions may be formed in a region necessary for providing the repair storage, and a degree of integration of the semiconductor device may be increased.

When pieces of repair information are stored in a repair storage, a repair operation using the pieces of repair information may be performed again. This may be a process for testing whether bad cells of semiconductor dies are normally replaced with redundancy cells when the repair operation is being performed using the pieces of repair information stored in the repair storage.

First, the pieces of repair information stored in the repair storage may be loaded into a repair register of each of the semiconductor dies (S35). The repair registers of the semiconductor device including the repair storage may receive and store the pieces of repair information directly from the repair storage. The semiconductor die not including the repair storage may receive pieces of repair information through an external transmission path connecting the semiconductor dies, such as a through-silicon via, a wire, or the like, and may store the pieces of repair information in the repair registers. Therefore, the repair register may output some of the pieces of repair information from the semiconductor die externally.

When the pieces of repair information are loaded into the repair registers, the memory blocks of each of the semiconductor dies may perform the repair operation using the pieces of repair information (S36), to replacing the bad cells with the redundancy cells. As described above, the pieces of repair information may include address information of a bad cell, address information of a redundancy cell to be replaced with the bad cell, or the like.

Each of the memory blocks may execute a test to determine whether the repair operation is successfully executed. For example, after replacing the bad cells with the redundancy cells, a test operation may be performed to determine whether the bad cells are detected (S37). When a bad cell is not detected in S37, the repair operation may be terminated (S40). When a bad cell is newly detected in S37, the newly detected bad cell may be replaced with a redundancy cell (S38).

When the newly detected bad cell is replaced with the redundancy cell, the semiconductor die may perform a test operation again to determine whether repair of the newly detected bad cell is possible (S39). As a result of the determination in S39, when it is determined that repair is possible, the repair operation may be terminated (S40). When it is determined in S39 that repair is impossible, the semiconductor die is determined as a failure, and as a result, the semiconductor device may be determined as a failure. For example, when there is a newly detected bad cell in S37, but no redundancy cell to be replaced it remains, the semiconductor die may be determined as a failure that cannot be repaired.

Figure 11:
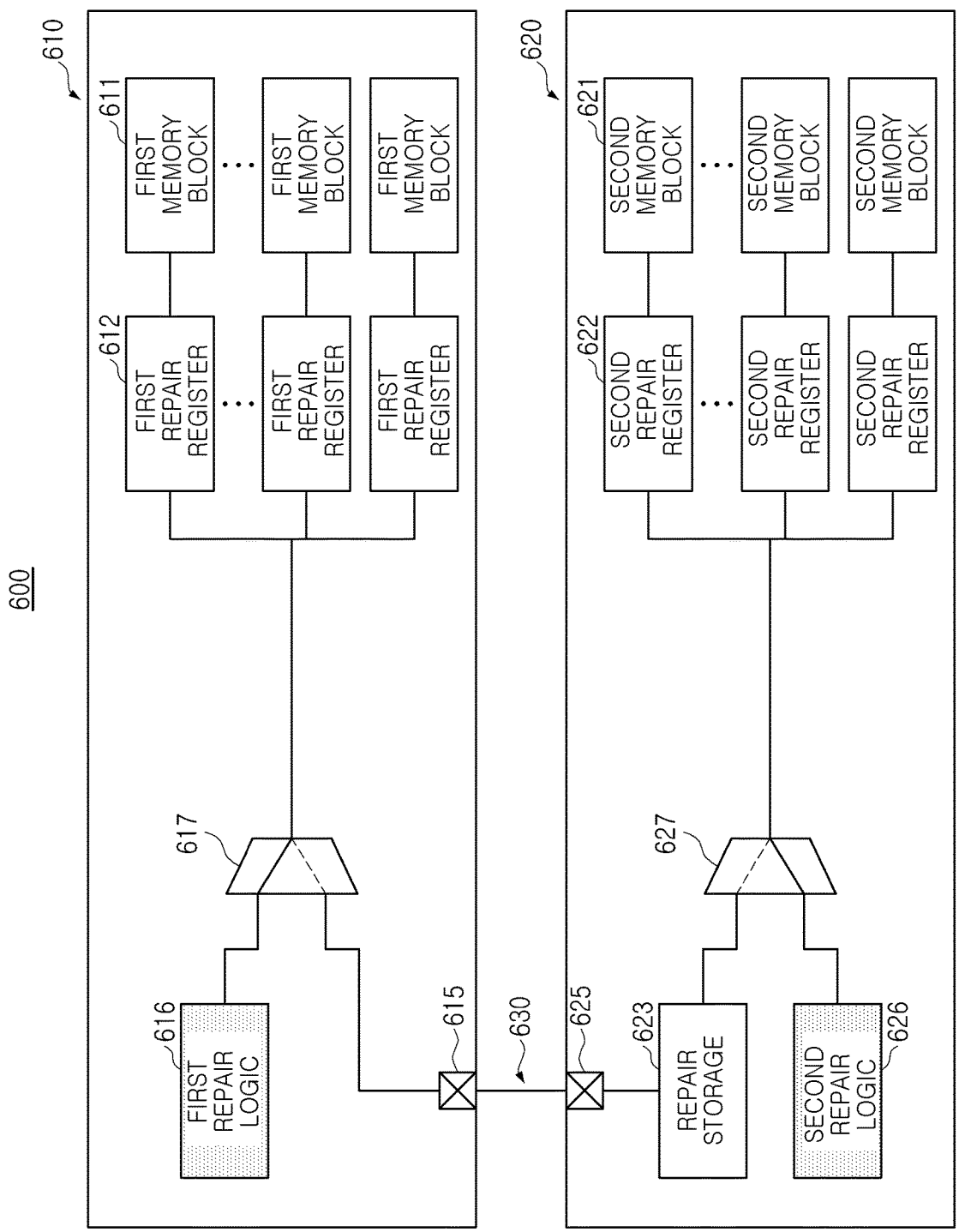
FIGS. 11 to 13 are views illustrating a repair operation of a semiconductor device according to an embodiment of the present inventive concept.
Figure 12:
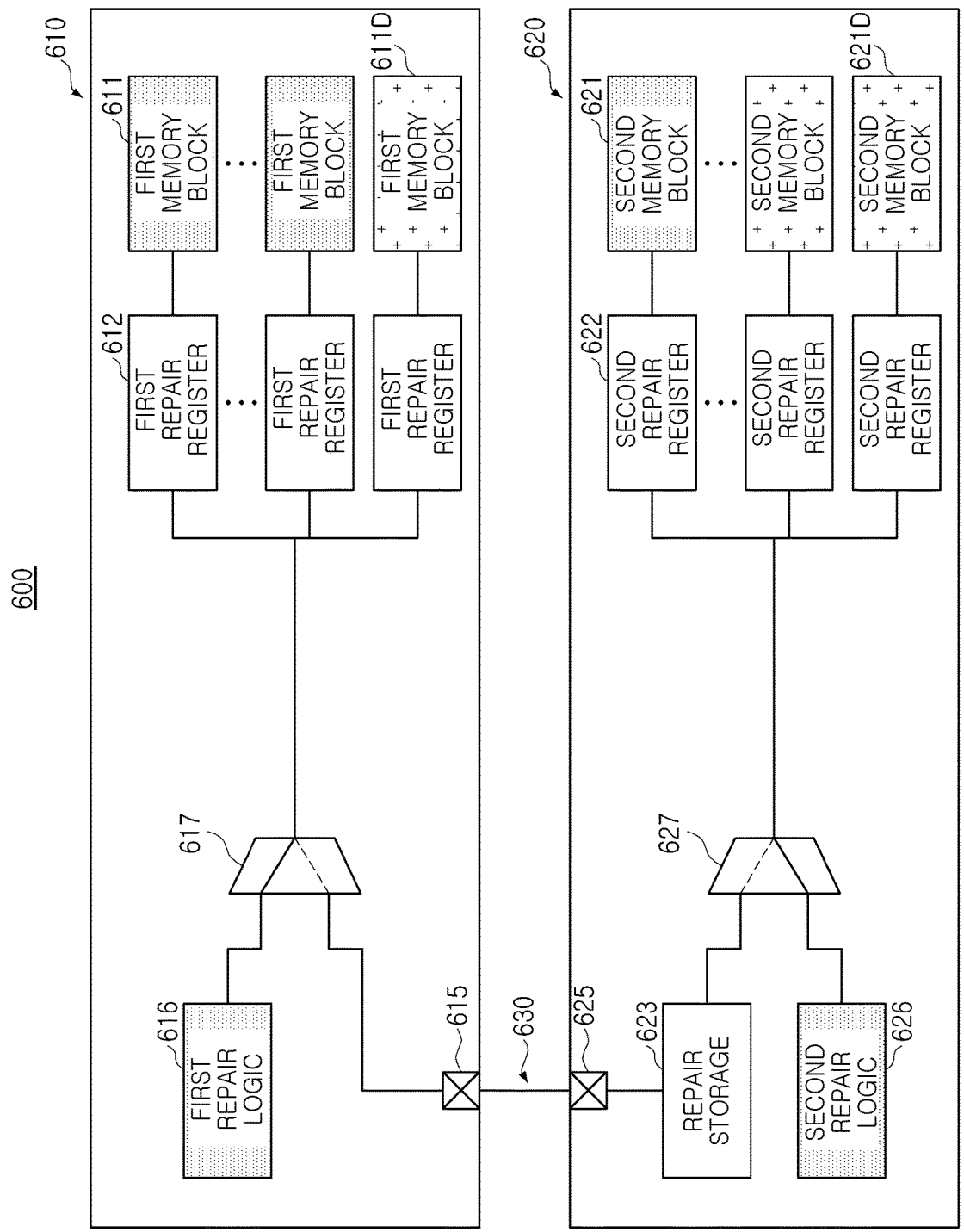
Figure 13:
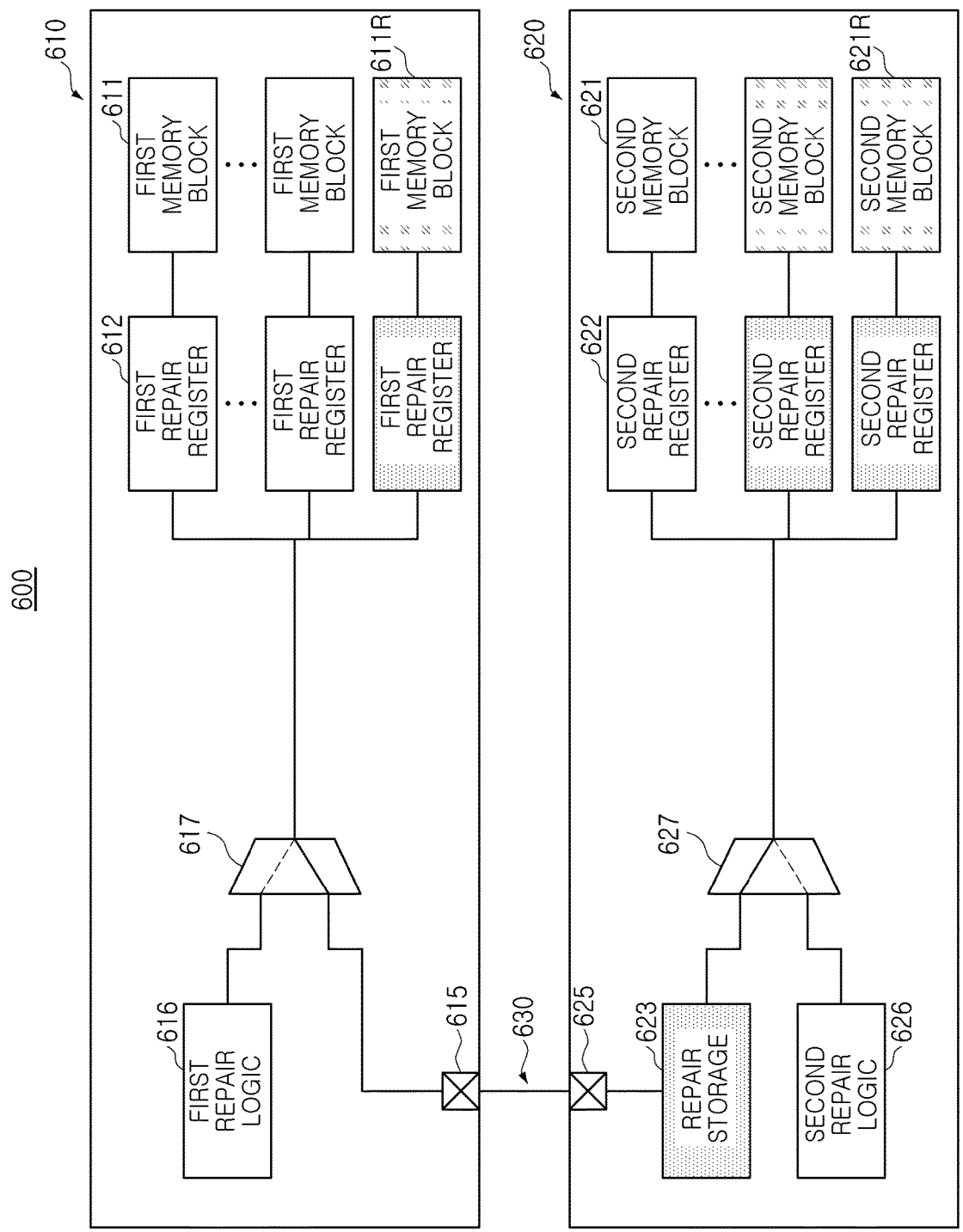

FIGS. 11 to 13 are views illustrating a repair operation of a semiconductor device according to an embodiment of the present inventive concept.

Referring to FIGS. 11 to 13, a semiconductor device 600, according to an embodiment of the present inventive concept, may include a first semiconductor die 610 and a second semiconductor die 620, connected to each other to communicate with each other, and unlike the first semiconductor die 610, the second semiconductor die 620 may include a repair storage 623. The repair storage 623 may include non-volatile memory devices, and may store pieces of repair information of a plurality of first memory blocks 611 and a plurality of second memory blocks 621.

Referring first to FIG. 11, in a state in which pieces of repair information are not stored in the repair storage 624, a repair operation may be performed first. The repair operation described with reference to FIG. 11 may be performed after the first semiconductor die 610 and the second semiconductor die 620 are connected to each other by a connection structure 630.

Therefore, as illustrated in FIG. 11, a first select circuit 617 and a second select circuit 627 may select a first repair logic 616 and a second repair logic 626, respectively. The first repair logic 616 may first perform a test operation, without pieces of repair information, to find a memory block in which a bad cell is present, among the plurality of first memory blocks 611. Similarly, the second repair logic 626 may also perform a test operation to find a memory block in which a bad cell is present, among the plurality of second memory blocks 621.

Referring to FIG. 12 illustrating results of the test operation, one bad first memory block 611) may be detected among the plurality of first memory blocks 611, and two bad second memory blocks 621D may be detected among the plurality of second memory blocks 621. For example, when at least one bad cell is included in a memory block, the memory block may be determined as a bad memory block.

The first repair logic 616 may instruct a repair operation on the bad first memory blocks 611D, and the second repair logic 626 may instruct a repair operation on the bad second memory blocks 621D. As described above, the repair operation may include an operation of replacing the detected bad cells with redundancy cells, and the bad cells may be replaced with the redundancy cells in units of word lines.

When the repair operation is completed, first pieces of repair information of the bad first memory block 611D and second pieces of repair information of the bad second memory blocks 621D may be stored in the repair storage. The first pieces of repair information may be transmitted to the second semiconductor die 620 through a first pad 615, the connection structure 630, and a second pad 625, and may be stored in the repair storage.

FIG. 13 is a view illustrating a repair operation performed after pieces of repair information are stored in the repair storage 623. Referring to FIG. 13, a path in which each of the first select circuit 617 and the second select circuit 627 is connected to the repair storage 623 may be selected to perform a repair operation using pieces of repair information stored in the repair storage 623.

The repair storage 623 may output the first pieces of repair information to the first semiconductor die 610 through the connection structure 630, and thus the first pieces of repair information may be stored in a first repair register 612 may be connected to a target first memory block 611R, which may be a repair target. The first repair register 612 may have a volatile characteristic that all data is deleted when power is off, and the repair operation described with reference to FIG. 13 may be performed when the semiconductor device 600 is booted. Therefore, the first pieces of repair information may be stored in an empty storage space of the first repair register 612.

The target first memory block 611R may be the same memory block as the bad first memory block 611D in which it is determined that a bad cell is present in the repair operation described above with reference to FIG. 12. The target first memory block 611R may receive the first pieces of repair information stored in the first repair register 612 to perform a repair operation. For example, the first pieces of repair information may include address information of bad cells included in the target first memory block 611R. The target first memory block 611R may find addresses of bad cells with reference to the first pieces of repair information, and may replace the bad cells having the addresses with redundancy cells.

The second pieces of repair information may be stored in second repair registers 622 connected to target second memory blocks 621R through the second select circuit 627. Each of the target second memory blocks 621R may perform a repair operation of replacing bad cells with redundancy cells with reference to the second pieces of repair information.

When the repair operation is completed, each of the first semiconductor die 610 and the second semiconductor die 620 may perform a test operation on the target first memory block 611R and a test operation on the target second memory blocks 621R, to be determined whether a normal operation is possible. When the target first memory block 611R and the target second memory blocks 621R pass the test operation, the semiconductor device 600 may be put into a subsequent process or shipped normally.

The semiconductor device 600 may be a system-on-chip, an application processor, a central processing unit, or the like, and may be mounted on an electronic device such as a server, a smartphone, a tablet PC, a laptop computer, or the like, to operate. When power is supplied by the electronic device on which the semiconductor device 600 is mounted and booting starts, the semiconductor device 600 may perform a repair operation using pieces of repair information stored in the repair storage 623, as described with reference to FIG. 13, to prevent an operating error due to bad cells.

Figure 14:
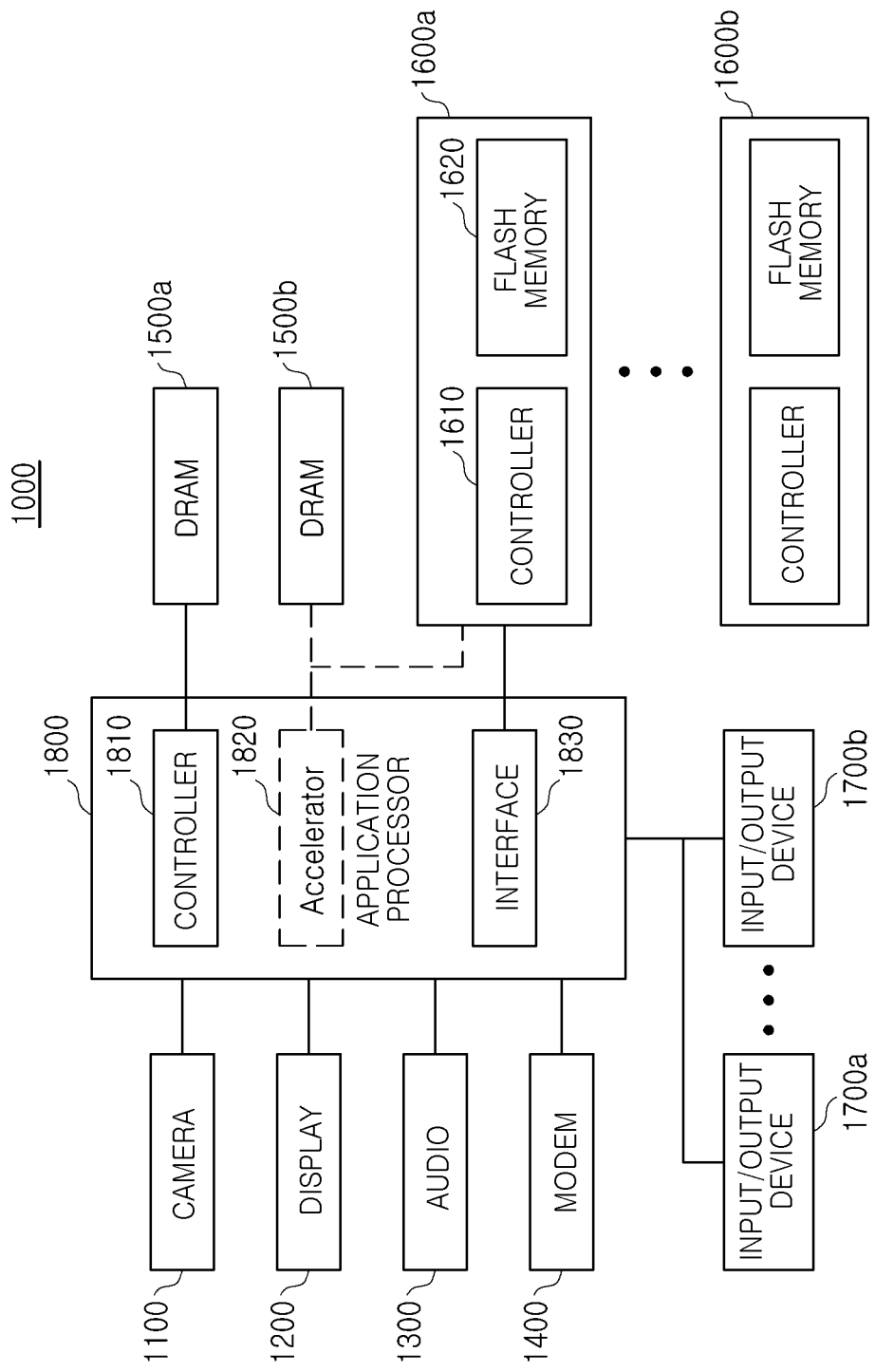
FIG. 14 is a block diagram schematically illustrating a system including a semiconductor device according to an embodiment of the present inventive concept.

FIG. 14 is a block diagram schematically illustrating a system including a semiconductor device according to an embodiment of the present inventive concept.

Referring to FIG. 14, a system 1000 may include a camera 1100, a display 1200, an audio processing unit 1300, a modem 1400, DRAMs 1500*a* and 1500*b*, flash memory devices 1600*a* and 1600*b*, input/output devices 1700*a* and 1700*b*, and an application processor (hereinafter, "AP") 1800. In an embodiment, the system 1000 may be provided as a laptop computer, a portable terminal, a smartphone, a tablet PC, a wearable device, a healthcare device, an internet-of-things (IoT) device, a server, or personal computer.

The camera 1100 may capture a still image or a moving image according to a user's control. The system 1000 may acquire specific information using the still image/moving image captured by the camera 1100, or may convert the still image/moving image into other types of data such as text or the like, and may store the same. Alternatively, the system 1000 may recognize a character string included in the still image/moving image captured by the camera 1100, to provide a text or audio translation corresponding to the character string.

The display 1200 may be implemented in various forms, such as a liquid crystal display (LCD), an organic light emitting diodes (OLED) display, an active-matrix organic light-emitting diode (AM-OLED), a plasma display panel (PDP), a field emission display (FED), an electronic paper, or the like. In an embodiment, the display 1200 may also be used as an input device of the system 1000 by providing a touch screen function. In addition, the display 1200 may be provided integrally with a fingerprint sensor or the like, to provide a security function of the system 1000.

The audio processing unit 1300 may process audio data stored in the flash memory devices 1600*a* and 1600*b* or audio data included in content received externally through the modem 1400 or the input/output devices 1700*a* and 1700*b*. For example, the audio processing unit 1300 may perform various processes such as coding/decoding, amplification, noise filtering, or the like on audio data.

The modem 1400 may modulate and transmit a signal to transmit/receive wired/wireless data, while demodulating a signal received externally to restore an original signal. The input/output devices 1700*a* and 1700*b* may be devices that provide digital input/output, and may include a port connectable to an external recording medium, an input device such as a touch screen, a mechanical button key, or the like, an output device outputting vibrations in a haptic manner, or the like. In some examples, the input/output devices 1700*a* and 1700*b* may be connected to the external recording medium through the port such as a USB, a lightning cable, an SD card, a micro SD card, a DVD, a network adapter, or the like.

The AP 1800 may control an overall operation of the system 1000. For example, the AP 1800 may control the display 1200 to display a portion of content stored in the flash memory devices 1600a and 1600b on a screen. Also, when a user input is received through the input/output devices 1700a and 1700b, the AP 1800 may perform a control operation corresponding to the user input.

The AP 1800 may be provided as a system-on-chip (SoC) driving an application program, an operating system (OS), and the like. Also, the AP 1800 may be included in one semiconductor package with other devices included in the system 1000, for example, a DRAM 1500a, a flash memory 1620 and/or a memory controller 1610, or the like.

In an embodiment, the AP 1800 may include an accelerator block 1820 that is a dedicated circuit for AI data operation. Alternatively, according to embodiments, a separate accelerator chip may be provided separately from the AP 1800, and a DRAM 1500b may be additionally connected to the accelerator block 1820 or an accelerator chip. The accelerator block 1820 may be a function block professionally performing a specific function of the AP 1800, and may include a graphics processing unit (GPU), which is a function block that professionally performs graphic data processing, AI calculation and inference, a neural processing unit (NPU), which is a block for professional execution, a data processing unit (DPU), which is a block for specialized data transmission, or the like.

According to an embodiment, the system 1000 may include a plurality of DRAMs 1500a and 1500b. In an embodiment, the AP 1800 may include a controller 1810 for controlling the DRAMs 1500a and 1500b, and the DRAM 1500a may be directly connected to the AP 1800. Although only the DRAMs 1500a and 1500b are illustrated in FIG. 14, a configuration of the system 1000 is not necessarily limited to such a form, and it depends on conditions such as a bandwidth, a reaction speed, and a voltage of the AP 1800 or the accelerator block 1820. Memory, other than the DRAMs 1500a and 1500b, may be included in the system 1000. For example, the controller 1810 and/or the accelerator block 1820 may control various memory such as a PRAM, an SRAM, an MRAM, an RRAM, an FRAM, a Hybrid RAM, or the like. Alternatively, at least some of the DRAMs 1500a and 1500b may be replaced with the PRAM, the MRAM, the RRAM, or the like.

The system 1000 may include a plurality of storage devices or a plurality of flash memory devices 1600a and 1600b, having a capacity greater than that of the DRAMs 1500a and 1500b. The flash memory devices 1600a and 1600b may include a controller 1610 and a flash memory 1620. The controller 1610 may receive a control command and data from the AP 1800, and may write the data to the flash memory 1620 in response to the control command or read the data stored in the flash memory 1620 to transmit the same to the AP 1800. At least some of the flash memory devices 1600a and 1600b may also be replaced with the PRAM, the MRAM, the RRAM, or the like, according to embodiments.

The AP 1800 may be provided in a form in which a plurality of semiconductor dies are packaged together, for example. Each of the plurality of semiconductor dies included in the AP 1800 may include memory blocks for temporarily storing and processing data received from the DRAMs 1500a and 1500b and/or the flash memory devices 1600a and 1600b, and repair registers coupled to the memory blocks. The repair registers may include a plurality of flip-flops for loading and temporarily storing pieces of repair information necessary for repairing a bad cell, when the bad cell is present in the memory blocks.

In an embodiment, only some of the plurality of semiconductor dies included in the AP 1800 may include a repair storage for storing the pieces of repair information. The repair storage may include memory devices having non-volatile characteristics, and thus the pieces of repair information in the repair storage may be completely maintained, even when power of the system 1000 is off. When power is supplied to the system 1000 and the AP 1800 again, the pieces of repair information stored in the repair storage may be loaded into repair registers, and the memory blocks perform a repair operation of replacing bad cells with redundancy cells with reference to the pieces of repair information.

According to an embodiment of the present inventive concept, a repair operation may be performed prior to performing a bonding process for two or more semiconductor dies included in one semiconductor device to determine whether an included semiconductor die cannot be repaired, to increase reliability of a semiconductor device. In addition, pieces of repair information of each of the semiconductor dies may be stored in a repair storage included only in some of the semiconductor dies stacked on each other and the repair storage may be shared among the semiconductor dies during the repair operation, to increase a degree of integration of the semiconductor device.

The various aspects and effects of the present inventive concept are not necessarily limited to the several embodiments described above.

While example embodiments have been illustrated and described above, it will be apparent to those skilled in the art that modifications and variations could be made without departing from the scope of the present inventive concept.

What is claimed is:

1. A semiconductor device, comprising:
a first semiconductor die including a plurality of first memory blocks and a plurality of first repair registers respectively connected to the plurality of first memory blocks; and
a second semiconductor die including a plurality of second memory blocks, a plurality of second repair registers respectively connected to the plurality of second memory blocks, and a repair storage, disposed within the second semiconductor die, configured to store first pieces of repair information for the plurality of first memory blocks of the first semiconductor die and second pieces of repair information for the plurality of second memory blocks of the second semiconductor die,
wherein the first semiconductor die and the second semiconductor die are stacked on each other,
wherein, when the semiconductor device is powered on, the plurality of first repair registers receive and store the first pieces of repair information from the repair storage, and the plurality of first memory blocks perform a repair operation based on the first pieces of repair information stored in the plurality of first repair registers,
wherein the first semiconductor die comprises a first repair logic configured to determine whether each of the plurality of first memory blocks can be repaired, and
wherein the second semiconductor die comprises a second repair logic configured to determine whether each of the plurality of second memory blocks can be repaired.

2. The semiconductor device of claim 1, wherein the repair storage comprises non-volatile memory.

3. The semiconductor device of claim 1, wherein each of the plurality of first memory blocks and the plurality of second memory blocks comprises a plurality of memory cells and a plurality of redundancy cells arranged in a plurality of rows and columns.

4. The semiconductor device of claim 3, wherein each of the plurality of first memory blocks is configured to replace at least one bad cell among the plurality of memory cells with at least one selected redundancy cell among the plurality of redundancy cells, based on the first pieces of repair information stored in the plurality of first repair registers.

5. The semiconductor device of claim 3, wherein each of the plurality of second memory blocks is configured to replace at least one bad cell among the plurality of memory cells with at least one selected redundancy cell among the plurality of redundancy cells, based on the second pieces of repair information stored in the plurality of second repair registers.

6. The semiconductor device of claim 1, further comprising:
    a plurality of through-silicon vias connecting the first semiconductor die and the second semiconductor die to each other and passing through at least one of a first semiconductor substrate included in the first semiconductor die and a second semiconductor substrate included in the second semiconductor die.

7. The semiconductor device of claim 6, wherein at least one of the plurality of through-silicon vias is connected between an output terminal of the repair storage and an input terminal of at least one of the plurality of first repair registers.

8. The semiconductor device of claim 1, wherein each of the plurality of first repair registers and the plurality of second repair registers comprises a plurality of flip-flops.

9. The semiconductor device of claim 1, wherein the first semiconductor die comprises a first logic region, and the second semiconductor die comprises a second logic region,
    wherein the first logic region and the second logic region execute different functions from each other.

10. The semiconductor device of claim 1, wherein a plurality of memory cells included in each of the plurality of first memory blocks and the plurality of second memory blocks include static random access memory (SRAM) cells.

11. The semiconductor device of claim 1, wherein the first repair logic is further configured to determine whether each of the plurality of first memory blocks can be repaired, in a state in which the first pieces of repair information are not stored in each of the plurality of first repair registers.

12. The semiconductor device of claim 11, wherein, when at least one first memory block among the plurality of first memory blocks includes a bad cell and it is determined that the bad cell can be repaired, the first repair logic stores the first pieces of repair information for the at least one first memory block in the repair storage.

13. The semiconductor device of claim 1, wherein the second repair logic is configured to determine whether each of the plurality of second memory blocks can be repaired, in a state in which the second pieces of repair information are not stored in each of the plurality of second repair registers.

14. The semiconductor device of claim 13, wherein, when at least one second memory block, among the plurality of second memory blocks, includes a bad cell and it is determined that the bad cell can be repaired, the second repair logic stores the second pieces of repair information for the at least one second memory block in the repair storage.

15. The semiconductor device of claim 1, wherein the repair storage stores result data pertaining to a test for determining whether each of the plurality of first memory blocks and the plurality of second memory blocks can be repaired as the first pieces of repair information and the second pieces of repair information, respectively, in a state in which information is not stored in each of the plurality of first repair registers and the plurality of second repair registers.

16. A semiconductor device, comprising:
    a plurality of memory blocks respectively including a plurality of memory cells;
    a plurality of repair registers respectively connected to the plurality of memory blocks; and
    a repair storage including non-volatile memory devices storing pieces of repair information,
    wherein, when the semiconductor device is powered on, each of the plurality of repair registers receives and stores first repair information among the pieces of repair information, and each of the plurality of memory blocks performs a repair operation based on the first repair information,
    wherein the repair storage outputs second repair information, different from the first repair information, among the pieces of repair information, and
    wherein the plurality of memory blocks are disposed among multiple semiconductor dies each comprising a repair logic configured to determine whether one or more of the plurality of memory blocks disposed in said each semiconductor die can be repaired, the repair storage is disposed within only one of the multiple semiconductor dies, and all of the plurality of repair registers from all of the multiple semiconductor dies store to the single repair storage disposed within only one of the multiple semiconductor dies.

17. The semiconductor device of claim 16,
    wherein the repair logic is configured to determine whether each of the plurality of memory blocks can be repaired, in a state in which the first repair information is not loaded into each of the plurality of repair registers.

18. The semiconductor device of claim 17, further comprising:
    a select circuit configured to select one of output of the repair logic or output of the repair storage.

19. A semiconductor device, comprising:
    a plurality of memory blocks respectively including a plurality of memory cells; and
    a plurality of repair registers respectively connected to the plurality of memory blocks,
    wherein each of the plurality of repair registers stores pieces of repair information received through at least one pad among a plurality of pads,
    wherein each of the plurality of memory blocks is configured to perform a repair operation based on the pieces of repair information to a repair storage, and
    wherein the plurality of memory blocks are disposed among multiple semiconductor dies each comprising a repair logic configured to determine whether one or more of the plurality of memory blocks disposed in said each semiconductor die can be repaired, the repair storage is disposed within only one of the multiple semiconductor dies, and all of the plurality of repair registers from all of the multiple semiconductor dies store to the single repair storage disposed within only one of the multiple semiconductor dies.

* * * * *